United States Patent
Clary

[19]

[11] Patent Number: 5,803,390
[45] Date of Patent: Sep. 8, 1998

[54] LINE TIGHTENER

[76] Inventor: Thomas A. Clary, Pinal Ranch, Miami-Superior Highway, P.O. Box 2513, Globe, Ariz. 85502

[21] Appl. No.: 915,882

[22] Filed: Aug. 21, 1997

[51] Int. Cl.[6] .................................................. B69H 77/00
[52] U.S. Cl. ................................. 242/388.2; 211/119.15
[58] Field of Search ...................... 242/388.2; 24/715 T; 211/119.15

[56]             References Cited

U.S. PATENT DOCUMENTS

| 491,743 | 2/1893 | Pratt | 242/388.2 |
|---|---|---|---|
| 540,125 | 5/1895 | Walton | 242/388.2 |
| 588,213 | 8/1897 | Beekly . | |
| 681,251 | 8/1901 | Nigg | 242/388.2 |
| 973,034 | 10/1910 | Graham | 242/388.2 |
| 1,261,505 | 4/1918 | Fitzsimmons . | |
| 1,570,291 | 1/1926 | Van Alstine | 242/388.2 |
| 1,896,705 | 2/1933 | Geisenhoner . | |
| 1,982,444 | 11/1934 | Miller | 242/388.2 |
| 2,642,639 | 6/1953 | Meighan et al. | 242/388.2 |
| 2,710,998 | 6/1955 | Meighan et al. | 242/388.2 |
| 3,874,638 | 4/1975 | Langlie et al. | 242/388.2 |
| 4,700,434 | 10/1987 | Fambrough | 242/388.2 |

FOREIGN PATENT DOCUMENTS 2 200 381 A   8/1988   United Kingdom ................ 242/388.2

*Primary Examiner*—John P. Darling
*Attorney, Agent, or Firm*—Cahill, Sutton & Thomas P.L.C.

[57]            ABSTRACT

The distal end of a handle employed to rotate a line tightening mandrel has a line engaging stop thereon and a removable pin for holding the line on the stop to prevent the stop from working free of the line.

6 Claims, 1 Drawing Sheet

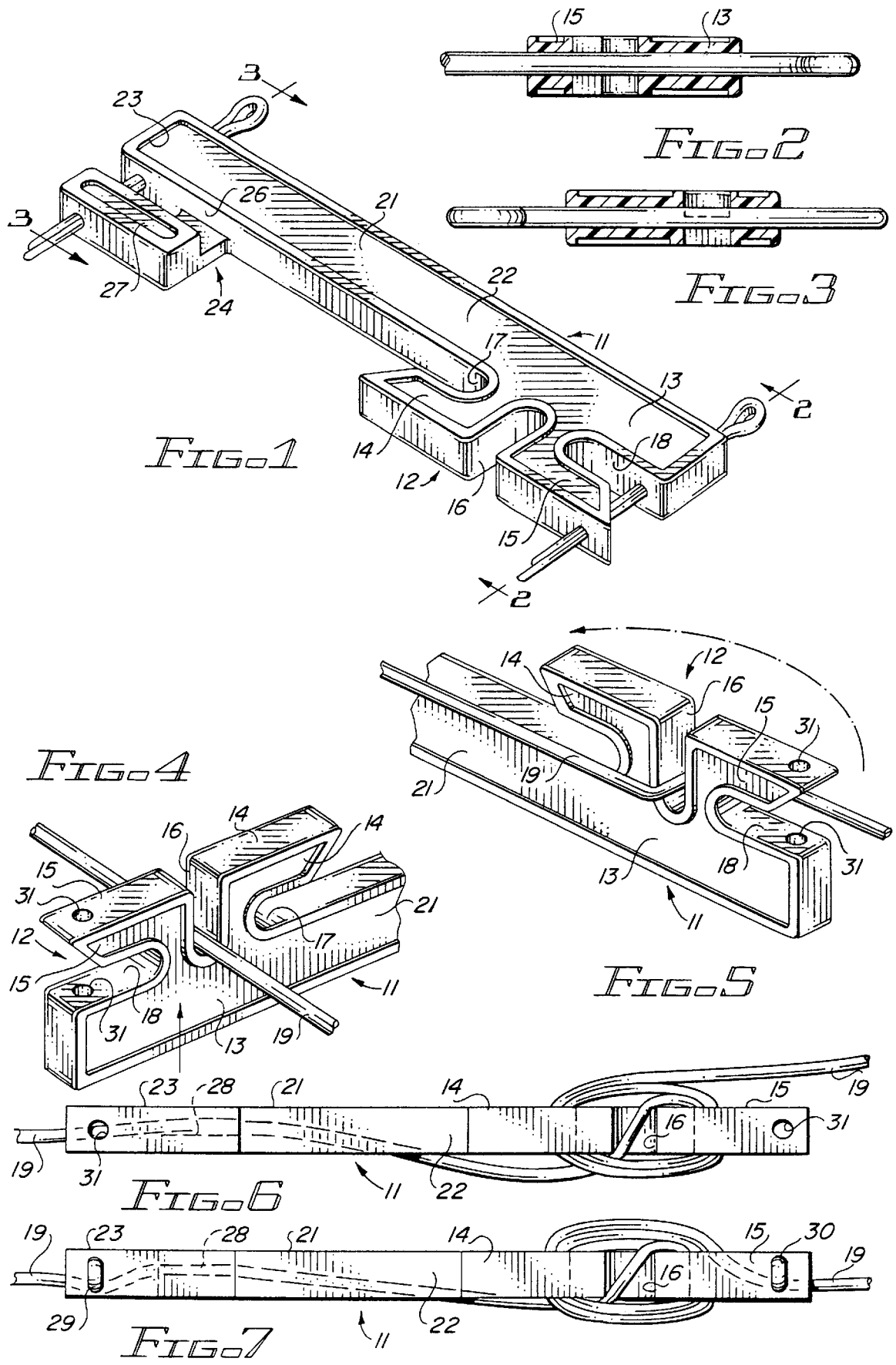

LINE TIGHTENER

TECHNICAL FIELD

This invention is concerned with improving a device for tightening a line to remove slack therefrom.

BACKGROUND ART

Lines, such as clothes lines, whether made of metal or fibers, stretch and become slack with use. So it has long been recognized that there is a need for a simple and effective device for removing that slack to tighten the line.

Of the many devices that have been devised for this purpose the clothes line tightener disclosed in U.S. Pat. No. 1,261,505 granted Apr. 2, 1918 to J. J. Fitzsimmons is among the simplest and most effective. And yet, it suffers from the drawback that it can be jostled loose by contact with the device or the line.

Thus, there is a need for a line tightener which is also simple and inexpensive, but is capable of being secured in place after the line has been tightened.

DISCLOSURE OF THE INVENTION

The invention is embodied in a tightener having a mandrel on which a line is to be wound. The mandrel has a transverse slot therein for receiving the line. A handle affixed to the mandrel is provided for rotating the mandrel to wind the line. The distal end of the handle has a line engaging stop thereon for preventing reverse rotation of the mandrel after the line has been tightened. And there is a removable pin extending through the distal end of the handle for engaging the line and preventing the stop from working free of the line.

BRIEF DESCRIPTION OF THE DRAWINGS

The invention is described in greater detail hereafter by reference to the accompanying drawings wherein:

FIG. 1 is a perspective view of a line tightener embodying the invention;

FIG. 2 is a sectional view through the tightener taken as indicated by line 2—2 in FIG. 1;

FIG. 3 is a sectional view through the tightener taken as indicated by line 3—3 in FIG. 1;

FIG. 4 is a partial perspective view of a tightener showing how a line is inserted into the tightener;

FIG. 5 is a partial perspective view showing how a line is wound on the tightener;

FIG. 6 is a plan view of the tightener showing a line wound thereon with no retainer pin in place; and FIG. 7 is a view similar to FIG. 6, but with retainer pins in place.

BEST MODES FOR CARRYING OUT THE INVENTION

The line tightener of this invention is designated generally in the drawings by reference numeral 11. The line tightener includes a mandrel 12 comprising a base 13 and oppositely disposed wing members 14 and 15 providing a transverse line receiving slot 16 and oppositely disposed winding slots 17 and 18.

FIG. 1 illustrates the tightener lying on its side. In use it most likely would be turned so that transverse slot 16 is open upwardly to receive the line 19 to be tightened (See FIG. 4). Thereafter the mandrel 12 is rotated by means of a handle 21 to wind the line 19 into slots 17 and 18.

Handle 21 is preferably formed integral with the base 13 of mandrel 12 so the proximal end 22 of the handle can be said to be affixed to the mandrel. The distal end 23 of handle 21 has formed therein a line engaging stop indicated generally at 24. Stop 24 preferably takes the form of a slot 26 between the handle 21 and an extension 27 thereof. A ledge 28 between the handle 21 and the extension actually engages the line to prevent reverse rotation of the mandrel 12 after the line is wound and tightened.

Tension created in the line 19 as a result of its being tightened is usually sufficient to hold the line in slot 26 against ledge 26 of stop 24 (See FIG. 6).

However, if the line 19 or the tightener 11 is jostled severely it is possible for the stop 24 to come free of line 19. In that event the line tension causes the mandrel 12 to rotate, loosening the line.

To prevent this from happening the distal end of the handle 21 is provided with a removable retainer pin 29. This pin preferably passes through holes provided therefor in the handle 21 and handle extension 27 on the center line of the tightener 11. The pin 29 is, of course, removed to wind the line 19 on mandrel 12 and put in place in the line engaging stop 24 after the line is tightened (See FIG. 7).

It is also desirable to provide a second retainer pin 30 which is adapted to extend through holes 31 provided in mandrel wing member 15 and the mandrel base 13. With retainer pins 29 and 30 in place as shown in FIG. 7 the tightener 11 is firmly secured to the line 19 and no amount of jostling will dislodge it accidentally.

The openings 31 for retainer pin 30 are also provided on the centerline of the tightener 11. With this arrangement with both pins 29 and 30 in place as shown in FIG. 7 the tightener assembly offers the further advantage that the leads of line 19 entering and leaving the tightener are in alignment. This can be important if the tightener 11 is used to snug a chalk line.

The tightener of this invention although highly reliable is inexpensive to produce. The particular version illustrated in the drawings can be readily molded of plastic material. The tightener can also be stamped from sheet metal. And the retainer pins 30 and 31 can be mass produced cotter pins available in the market place.

What is claimed is:

1. A line tightener comprising a rotatable mandrel having a transverse slot therein for receiving a line to be tightened, an elongated handle for rotating the mandrel and having a proximal end and a distal end, the proximal end of said handle being formed integral with said mandrel, the distal end of said handle having a line engaging stop thereon for preventing reverse rotation of the mandrel when the line has been tightened, and a removable retainer pin extending transversely through the distal end of the handle for preventing the stop from working free of the line.

2. The line tightener of claim 1 further comprising a second removable pin extending transversely through the mandrel for positioning the line on the mandrel.

3. The line tightener of claim 2 wherein said pin and said second pin are positioned along a center line of the handle.

4. A line tightener comprising a substantially flat rotatable mandrel, said mandrel comprising a base and oppositely disposed wing members providing there between a transverse line receiving slot and providing with said base oppositely disposed winding slots, an elongated handle formed integrally with the mandrel for rotating the mandrel to tighten a line passing through the line receiving slot in the mandrel, the proximal end of the handle being integral with the base of the mandrel, the distal end of the handle having a stop thereon for engaging the line being tightened to prevent reverse rotation of the tightener, and a removable retainer pin extending transversely through the distal end of the handle for preventing the handle stop from working free of the line.

5. The line tightener of claim 4 further comprising a second removable pin extending transversely through the base and one of the wing members of the mandrel for positioning the line on the mandrel.

6. The line tightener of claim 5 wherein said pin and said second pin are positioned along a center line of the handle.

* * * * *